(12) United States Patent
Ito

(10) Patent No.: US 8,320,068 B1
(45) Date of Patent: Nov. 27, 2012

(54) RECORDING MEDIUM AND RECORDING APPARATUS FOR USING TEST DATA RECORDED IN A BLANK ZONE TO REFINE DATA RECORDING

(75) Inventor: Kiyotada Ito, Hiratsuka (JP)

(73) Assignee: Marvell International Ltd., Hamilton (BM)

(*) Notice: Subject to any disclaimer, the term of this patent is extended or adjusted under 35 U.S.C. 154(b) by 0 days.

(21) Appl. No.: 13/356,134

(22) Filed: Jan. 23, 2012

Related U.S. Application Data

(62) Division of application No. 12/184,196, filed on Jul. 31, 2008, now Pat. No. 8,125,725.

(60) Provisional application No. 60/980,002, filed on Oct. 15, 2007.

(51) Int. Cl.
G11B 5/09 (2006.01)
G11B 21/02 (2006.01)

(52) U.S. Cl. .......................... 360/48; 360/75

(58) Field of Classification Search .................. None
See application file for complete search history.

(56) References Cited

U.S. PATENT DOCUMENTS

| | | | |
|---|---|---|---|
| 6,144,516 A | 11/2000 | Takeda et al. | |
| 6,320,718 B1 | 11/2001 | Bouwkamp et al. | |
| 6,643,084 B1 | 11/2003 | Andrew et al. | |
| 6,650,491 B2 | 11/2003 | Suzuki et al. | |
| 7,106,534 B2 | 9/2006 | Yoshida et al. | |
| 7,173,788 B2 * | 2/2007 | Nakamura et al. | 360/75 |
| 7,724,457 B2 | 5/2010 | Dang et al. | |
| 2007/0159942 A1 | 7/2007 | Takeshita et al. | |
| 2009/0244752 A1 | 10/2009 | Baumgart et al. | |

* cited by examiner

*Primary Examiner* — Regina N. Holder

(57) ABSTRACT

In some implementations, a recording medium includes a plurality of data areas, a plurality of data area separating sections, and one or more blank zones. Each data area is configured to store data. Each data area separating section is disposed between the data areas and extends in parallel with respect to the data areas. Each data area separating section is configured to prevent data from being written into the data area separating section. Each blank zone extends in a direction perpendicular to the data areas and is configured to record written data.

20 Claims, 13 Drawing Sheets

A-A'

100

RECORDING MEDIUM AND RECORDING APPARATUS FOR USING TEST DATA RECORDED IN A BLANK ZONE TO REFINE DATA RECORDING

CROSS-REFERENCE TO RELATED APPLICATIONS

This application is a divisional application of, and claims priority to U.S. patent application Ser. No. 12/184,196, filed on Jul. 31, 2008, entitled "Recording Medium and Recording Apparatus for Using Test Data Recorded in a Blank Zone to Refine Data Recording", which claims priority from U.S. Provisional Patent Application No. 60/980,002, filed on Oct. 15, 2007, entitled "Head Positioning for Discrete Track Recording". The application herein claims the benefit of priority of all of the above listed patent applications and hereby incorporates by reference in their entirety the said patent applications.

TECHNICAL FIELD

The present invention relates to a storage device and system.

BACKGROUND

As new technology drives up the demand for video and audio data, the demand for magnetic and hard disk drives with large storage capacity also has increased. The popularity for small-scale disk drives also has increased due to the frequent need to store data in mobile devices such as cell phones and personal computers such as laptops. To realize large-capacity and small-sized recording disk drives, one conventional solution includes increasing the track density of recording media used for data storage. However, increasing track density can cause data between tracks to interfere with each other, which may prevent disk drives from locating, recording and/or extracting data accurately.

SUMMARY

Methods, systems and computer program products for measuring a distance between a write head and a read head are described. The measured distance allows the position of the write head (e.g., during writing) and read head (e.g., during reading) to be compensated. The compensation further allows a hard disk drive to accurately position the read head over a desired sector without displacing the write head from the sector.

In some implementations, a recording medium includes: a plurality of data areas, each data area being configured to store data, a plurality of data area separating sections, each data area separating section being disposed between the data areas and extending in parallel with respect to the data areas, each data area separating section being configured to prevent data from being written into the data area separating section, and one or more blank zones each extending in a direction perpendicular to the data areas, the one or more blank zones being configured to record written data.

In some implementations, a recording apparatus includes: a head section which includes a write head to write data into a recording medium and a read head to read data from the recording medium, a head control section having a head driving section to control movement of the write head and the read head, the head control section further including: a head gap data writing section which commands the head driving section to position the write head to record predetermined test data into a region of the recording medium, a head gap data reading section which commands the head driving section to position the read head to read the predetermined test data while varying a position of the head section, a gap storing section which stores gap information, the gap information being generated based on a difference between a position of the head section when test data is written and a position of the head section when test data is read, and a head position control section which adjusts the position of the head section based on the gap information when writing user data into the recording medium.

In some implementations, a method includes: writing test data into a blank zone corresponding to a data area over which non-test data is to be written, determining an offset with respect to the data area, reading data at an offset position associated with the offset, determining whether the read data matches the written test data, and identifying an error between the read data and the written test data if the read data does not match the written test data.

In some implementations, a method includes: reading, using a read element of a head, servo data from a servo sector on a recording medium, determining a first position of the read element from the servo data relative to the recording medium, writing, using a write element of the head, test data into a blank zone corresponding to a data area over which data is to be written, moving the read element to a second position to read the written test data, and determining a distance between the read element and the write element based on the first position and the second position.

The details of one or more embodiments of the invention are set forth in the accompanying drawings and the description below. Other features and advantages of the invention will be apparent from the description and drawings, and from the claims

DETAILED DESCRIPTION

System Overview

Figure 1:
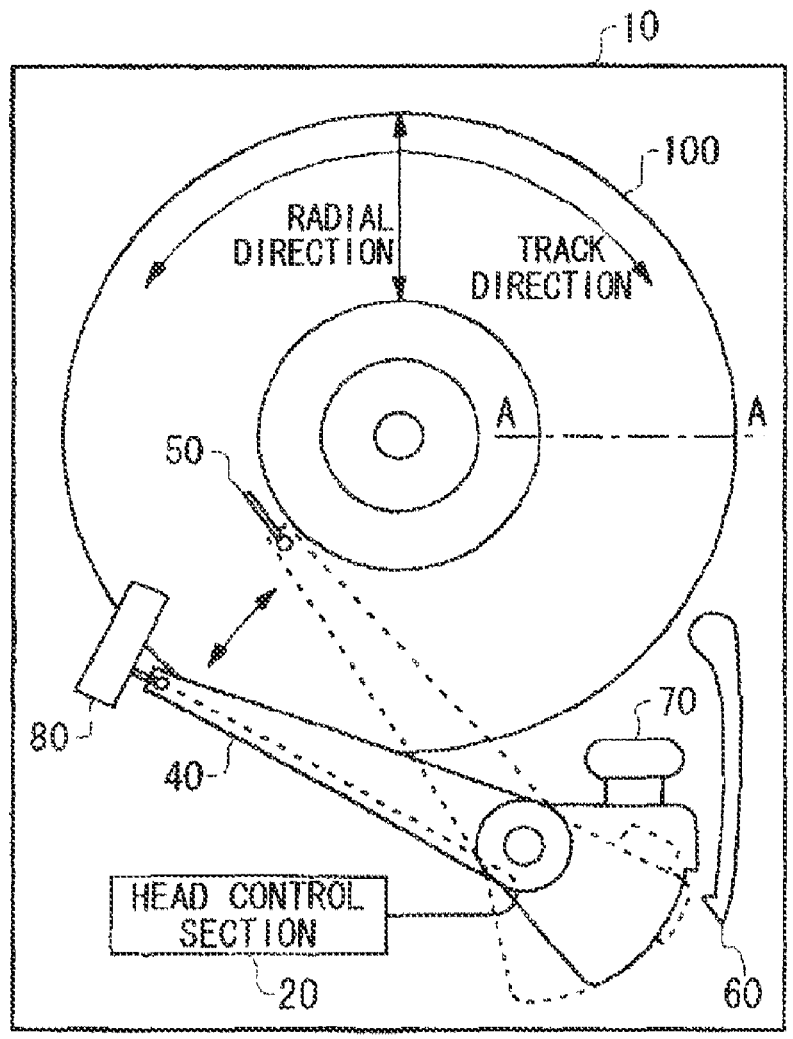
FIG. 1 illustrates an example configuration of a recording apparatus.

FIG. 1 illustrates an example configuration of a recording apparatus 10. The recording apparatus 10 may be, for example, a hard disk drive used for writing and reading data. As shown, the recording apparatus 10 may include a recording medium 100. The recording medium 100 may be a disk or magnetic tape having a substrate surface subject to magnetic flux. The recording medium 100 may have sectors formed therein successively in the radial direction, and data may be written into the sectors. The sectors may be positioned adjacent to data areas in the radial direction.

The recording medium 100 also may include blank zones where no data is written. The blank zones allow the recording apparatus 10 to avoid writing test data into an area used for separating data areas ("a data area separating section") while measuring the gap between the read head and the write head of a head section 50 (as will be discussed in greater detail below). In one implementation, these blank zones may be separate from the sectors. In another implementation, these blank zones may be sectors without written data designated for gap measuring purposes.

While FIG. 1 illustrates a recording apparatus 10 with a single recording medium 100, the recording apparatus 10 also may process a plurality of recording media 100, which may be stacked in a direction perpendicular to surfaces of the media. Also, while the recording medium 100 has a circular shape, other shapes also are contemplated.

The recording medium 100 may include a plurality of tracks formed in parallel and extending in a track direction. In one implementation, each track may be formed concentrically with respect to the center of the recording medium 100. In this implementation, the track direction may denote the circumference direction of the recording medium 100.

In some implementations, adjacent tracks may have a same distance therebetween in a perpendicular direction that is perpendicular to the track direction. In these implementations, the perpendicular direction may correspond to a radial direction of the recording medium 100. Each track may be divided into a plurality of data areas in the track direction.

A data area separating section may be formed between data areas positioned adjacent to each other in the radial direction. The recording apparatus 10 may bypass writing data into the data area separating section. The data area separating section may serve as a buffer to reduce data interference between data areas when the data areas are arranged in close proximity.

The recording apparatus 10 also may include a head control section 20, an actuator arm 40, a head section 50, an inertia latch 60, a magnet latch 70 and a ramp section 80. The recording medium 100 records thereon user data. The head section 50 may be used to read and write data into the recording medium 100, and may be fixed to one end of the actuator arm 40. The actuator arm 40 may be configured to position or reposition the head section 50 to a designated track position around the rotational axis.

The ramp section 80 may be provided in the recording medium 100 within a non-overlapping region which does not overlap the recording region. The ramp section 80 may accommodate the head section 50 while the recording apparatus 10 is, for example, inactive. The magnet latch 70 may draw the actuator arm 40 to the ramp section 80 so that the head section 50 may rest on the ramp section 80. The inertia latch 60 may be in contact with the protrusion of the actuator arm 40 to thereby keep the head section 50 close to the ramp section 80.

The head control section 20 may control the position of the head section 50 to effectuate data writing and data reading. For example, the head control section 20 may control the head section 50 to a predetermined data writing or reading position to initiate writing data at or reading data at this position.

Recording Medium Overview

Figure 2A:
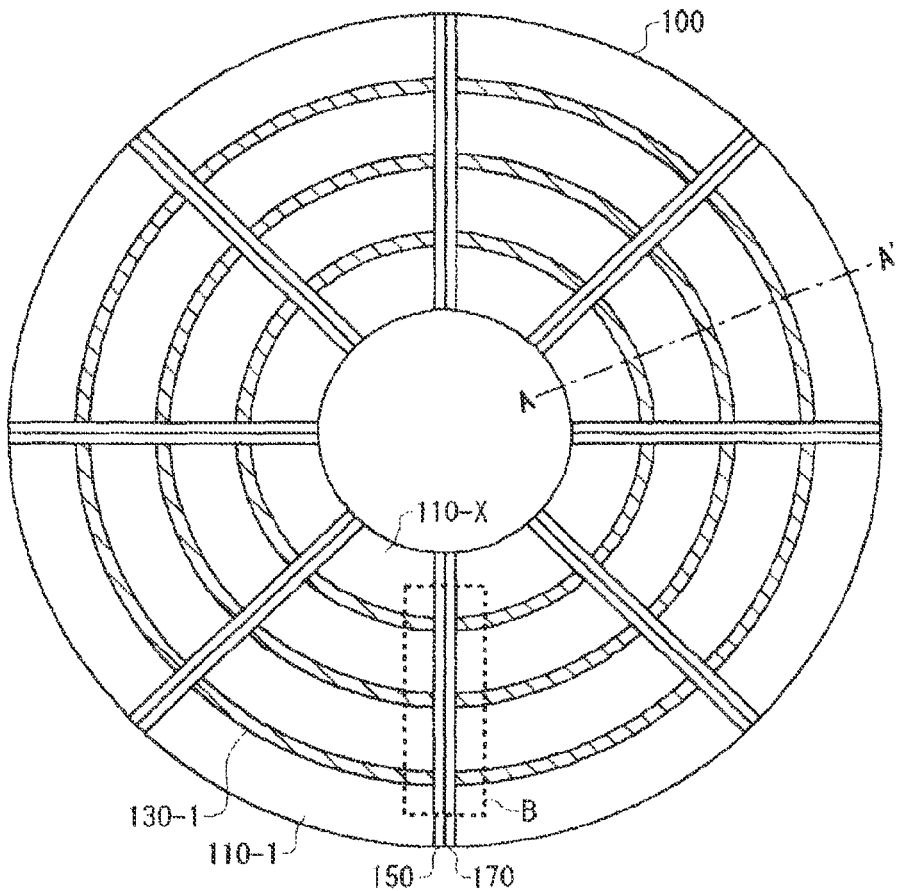
FIG. 2A is a schematic view illustrating an example configuration of a recording medium.
Figure 2B:
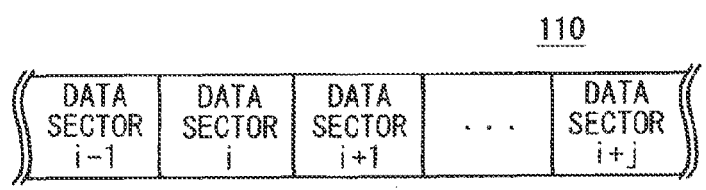
FIG. 2B is an enlarged view of an example data area.

FIG. 2A is a schematic view illustrating an example configuration of a recording medium 100. The recording medium 100 may include a surface on which data can be written. FIG. 2B is an enlarged view illustrating an example data area 110.

As shown in FIG. 2A, the recording medium 100 may include a plurality of data areas 110, a plurality of data area separating sections 130, a plurality of servo sectors 150 and a plurality of blank zones 170. In general, the recording medium 100 may include a greater or lesser number of tracks, data areas, data area separating sections, servo sectors and blank zones than those shown in FIGS. 2A and 2B.

As discussed previously, the recording medium 100 may include a plurality of tracks formed concentrically. Each track may be divided into a plurality of data areas 110 for recording data. The data areas 110 may be arranged adjacent to the other in the track direction (e.g., in the circumference direction), and may be formed in parallel (e.g., in the radial direction).

As illustrated in FIG. 2B, each data area 110 may be divided into a plurality of data sectors (e.g., data sector i−1, data sector i . . . data sector i+j) in the track direction. In one implementation, a data sector may be divided into two data sub-sectors, and the data sub-sectors may be provided at the front and back of a servo sector 150 or blank zone 170 so as to sandwich the servo sector or blank zone between the sub-sectors.

The data area separating sections 130 may be provided between the data areas 110 and may extend in parallel along boundaries of the data areas 110. The data area separating sections 130 may be provided at all or portions of the boundaries between the data areas 110. In one implementation, a non-magnetic material may be applied to surfaces of the data area separating sections 130 to prevent the head section 50 from writing data over the data area separating sections 130. The data area separating sections may be used to distance a data area from other data areas to minimize data interference between the data areas 110.

The servo sectors 150 may be formed at different positions with respect to the data areas 110 (e.g., in the track direction). In one implementation, the servo sectors 150 may be formed in an alternate arrangement with respect to the data areas 110. For example, the recording medium 100 may include a first servo sector followed by a data area and a second servo sector in the radial direction. In this implementation, each servo sector 150 may span, for example, from a data area 110-1 to a data area 110-x. In another implementation, each servo sector 150 may include a control pattern written thereon, which may be used to control the position of the head section 50 (as will be discussed with respect to FIG. 4).

The head section 50 generally includes a write head 52 and a read head 54 (as will be discussed with respect to FIG. 5). The write head 52 and the read head 54 may be fixed relative to each other.

To read data, the recording apparatus 10 may position the read head 54 over, for example, a central region (e.g., along a central axis) of a sector having the desired data. Because the read head 54 has a finite distance relative to the write head 52, the write head 52 may be displaced from the sector (e.g., the write head 52 is instead positioned over a different sector or a blank zone) while positioning the read head 54, which prohibits the recording apparatus 10 from writing data to the sector. In one implementation, the displacement may be a distance equal to the gap between the write head 52 and the read head 54. In this implementation, the gap between the write head 52 and the read head 54 may be measured, and the position of the head section 50 may be compensated based on the measured gap. The compensation allows the recording apparatus 10 to accurately position the read head 54 over the desired sector without displacing the write head 52 from the sector.

To measure the gap between the write head 52 and the read head 54, in one implementation, blank zones 170 may be provided along the data areas 110 and data area separating sections 130 where test data may be written. In this implementation, the write head 52 may write test data into the blank zones 170, and the read head 54 may read out the written test data. Based on the moved distance of the head, the gap between the write head 52 and the read head 54 may be determined. In one implementation, while writing test data, the recording apparatus 10 may determine the position of the head section 50 by determining the position of the read head 54 based on the pattern read from a servo sector.

Blank zones 170 may be provided adjacent to the data areas 110. Specifically, a blank zone 170 may be formed between a servo sector 150 and the data areas 110. In one implementation, a blank zone 170 may be formed in a one-to-one ratio with respect to a group of one or more data areas 110. For example, a group including a blank zone and one or more data areas may be sequentially formed and arranged on the recording medium 100. In another implementation, a blank zone 170 may be formed relative to certain groups of data areas 110.

Each blank zone 170 may be formed by joining successive blanks in between the data areas 110 and data area separating sections 130. Each blank zone 170 may extend, for example, from a data area 110-1 to a data area 110-x. In other words, each blank zone 170 may extend between the respective edge of the recording medium 100 in the radial direction. Each blank zone 170 also may continuously extend along a corresponding servo sector 150.

Figure 3:
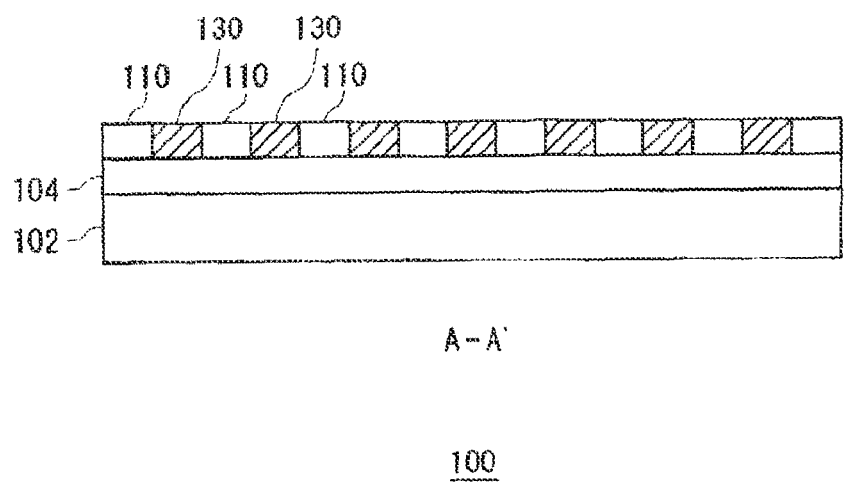
FIG. 3 shows an example cross-section of the recording medium shown in FIG. 2A.

FIG. 3 shows an example cross-section of the recording medium 100 along the A-A' axis shown in FIG. 2A. As shown, the recording medium 100 includes a substrate 102, soft magnetic layer 104, data areas 110 and data area separating sections 130.

In one implementation, data areas 110, data area separating sections 130, servo sectors 150, and blank zones 170 may be formed on the substrate 102. The substrate 102 may be a glass substrate. The soft magnetic layer 104 may function as a magnetic circuit with the write head 52 and as a path through which magnetic flux can travel when data is written into the data areas 110.

In one implementation, the data areas 110 may be formed by applying a layer of magnetic material over the surface of the soft magnetic layer 104. The data area separating sections 130 may be formed by establishing groove sections in the layer of magnetic material, and filling the groove sections with a layer of non-magnetic material. This structure allows the recording medium 100 to further reduce data interference between adjacent data areas 110.

Figure 4:
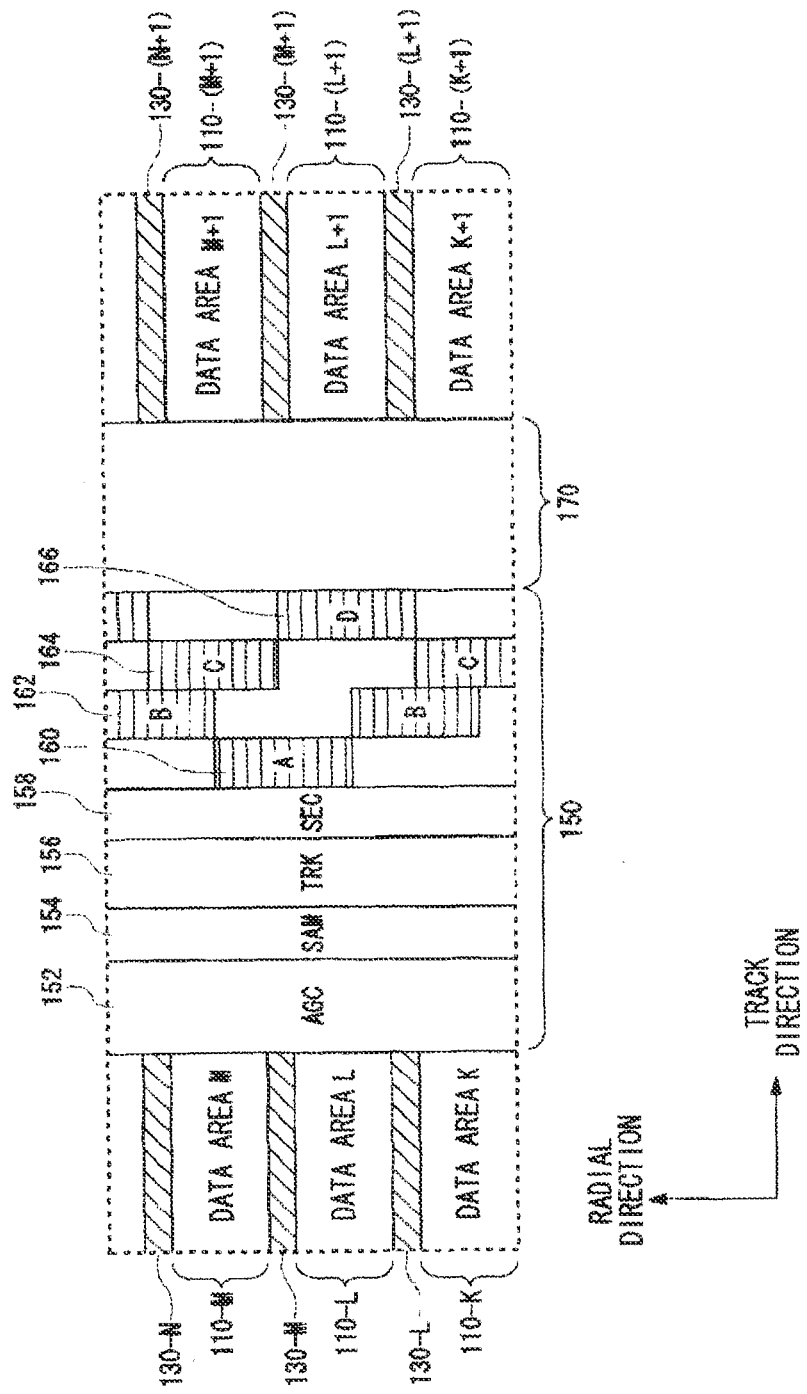
FIG. 4 is an enlarged view of a region B shown in FIG. 2A.

FIG. 4 is an enlarged view of the region B shown in FIG. 2A. As discussed previously, the servo sectors 150, blank zones 170 and data areas 110 may be formed in the track direction on the surface of the recording medium 100. The data areas 110 also may be arranged adjacent to each other in the radial direction. For example, as shown in FIG. 4, data area 110-M may be formed adjacent to data area 110-L, which may be formed adjacent to data area 110-K.

In one implementation, a predetermined control pattern may be written in each servo sector 150. The control pattern in each servo sector 150 may be provided by conventional imprinting techniques such as electron beam lithography. As shown, each servo sector 150 may include an amplitude adjusting region (AGC) 152, a servo address mark region (SAM) 154, a track address region (TRK) 156, a sector address region (SEC) 158, and one or more burst data regions with burst data 160-166. Data written in the amplitude adjusting region 152 may be used to adjust an amplitude amplifying ratio used by the head section 50 for reading data. In general, the control pattern written in the servo sectors 150 is not limited to the pattern described above. Other control patterns also are possible.

Generally, data written in the servo address mark region 154 identifies each individual servo sector 150, while data written in the track address region 156 distinguishes each individual track, and data written in the sector address region 158 distinguishes each individual data sector.

In the burst data region, burst data 160-166 (A-D) may be written. In one implementation, burst data 160-166 may be used to adjust the position of the head section 50. Each burst data written at a different position on the recording surface may include a same or different data. Each burst data may be arranged which partially overlaps one or more of other burst data in the radial direction.

In one implementation, the control pattern in the servo sectors 150 may be used to control the positioning of the head section 50. Specifically, the head control section 20 may read the burst data 160-166 using the read head 54 in order to control the position of the head section 50. For example, assuming that the head section 50 is to be positioned on the center line of the data area 110-(L+1) in the radial direction, the head control section 20 first moves the head section 50 to the data area 110-(L+1) so that data read from the sector address region 158 may be associated with the data area 110-(L+1). Then, the head control section 20 moves the head section 50 to a boundary between the burst data A and the burst data B, which is associated with the center line of the data area 110-(L+1), and read out data either from the boundary or a predetermined range around the boundary.

A blank zone 170 may be provided between the burst data region, the data areas 110 and the data area separating sections 130. The blank zone 170 may be formed with a region length in the track direction capable of recording a plurality of bits. For example, the region length of the blank zone 170 may be longer (or shorter) than the region length of a burst data in the track direction. As another example, the region length of the blank zone 170 may be longer (or shorter) than the region length of a data area 110 in the track direction. As yet another example, the region length of the blank zone 170 may be longer (or shorter) than the region length of a servo sector 150 in the track direction. The recording frequency for the blank zone 170 may be equal to or different from the recording frequency for the servo sector 150 in the same track. Similarly, the recording frequency for the blank zone 170 may be equal to or different from the recording frequency for the data areas 110 in the same track.

Figure 5:
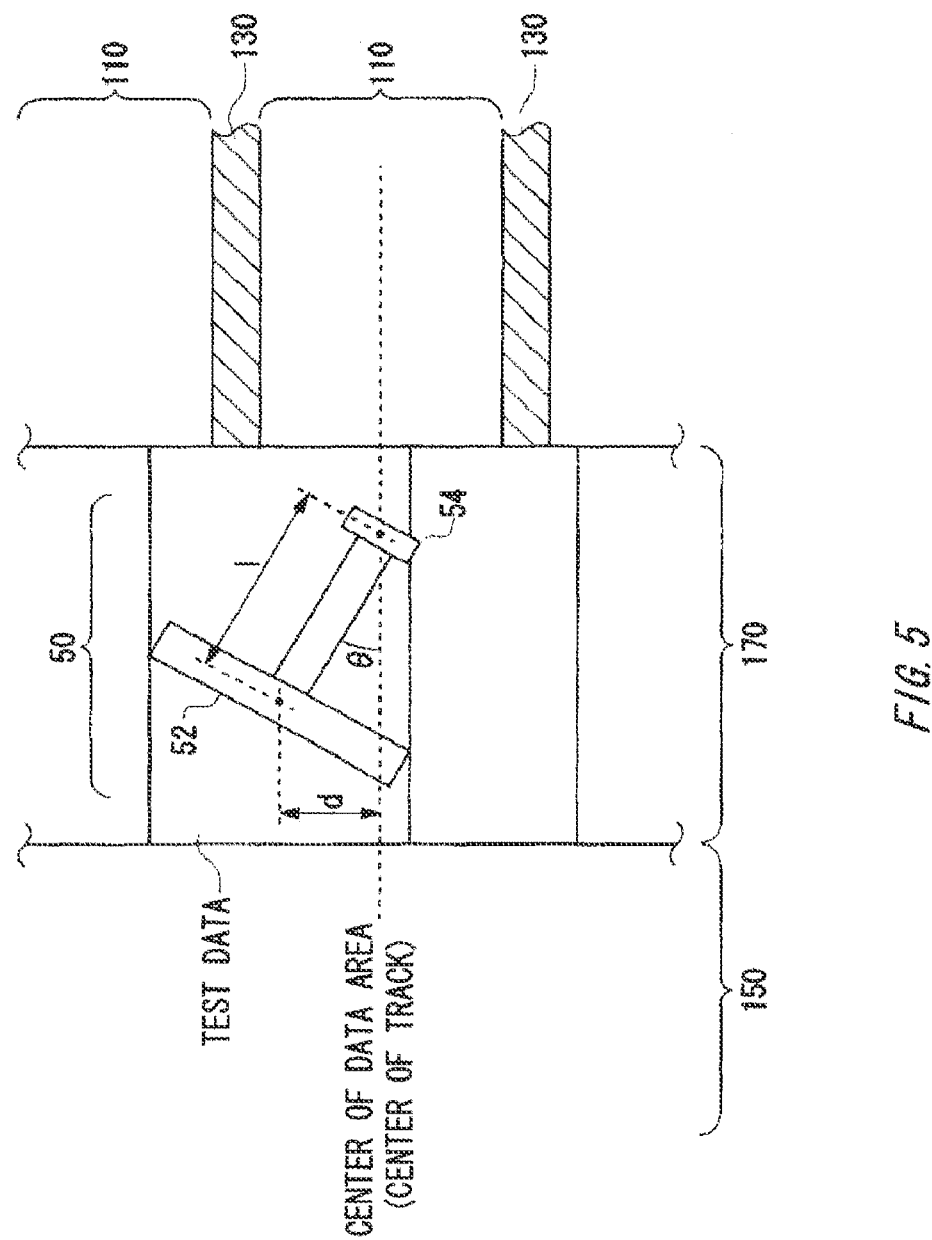
FIG. 5 illustrates an example position of a head section relative to a surface of a recording medium.

FIG. 5 illustrates an example position of the head section 50 relative to the recording medium 100. As shown, the head section 50 includes a write head 52 and a read head 54. The write head 52 may perform data writing by controlling the magnetic states of respective bits in the data areas 110 or blank zones 170, while the read head 54 may perform data reading by detecting the magnetic states of the bits.

The write head 52 and read head 54 may be spaced from each other by a distance/(e.g., in the direction in which the actuator arm 40 extends). The write head 52 and read head 54 also may have a gap d therebetween in the radial direction (e.g., as measured from their respective central axis). The head control section 20 may perform measurement of the gap d while the head section 50 is active (or inactive).

In one implementation, the head control section 20 controls the position of the head section 50 so that the read head 54 may be positioned over a given blank zone 170 along the central axis (shown as dotted line in FIG. 5) of a data area 110. This position allows the write head 52 to write test data over the blank zone 170. In one implementation, the head control section 20 may write, into the blank zone 170, test data having two or more bits in the track direction.

In one implementation, the blank zone 170 may be formed with a length larger than the distance between the write head 52 and the read head 54 (e.g., in the track direction). The blank zone 170 also may be formed with a length in the track direction larger than the distance/between the write head 52 and the read head 54 in the direction that the actuator arm 40 extends.

After writing test data, the head control section 20 may read the test data while varying the position of the head section 50 (e.g., in the radial direction). The head control section 20 may measure the gap d (e.g., based on the distance moved) which enables the head control section 20 to further refine the head position so as to allow accurate data reading (or writing). In one implementation, the head control section 20 may compensate or adjust the position of the head section 50 based on the measured gap d while writing data into a data area 110.

As described with respect to FIG. 1, the rotation of the actuator arm 40 may drive the head section 50 to a designated position. Therefore, the gap d between the write head 52 and the read head 54 in the radial direction may vary relative to a rotational angle θ of the actuator arm 40. In other words, the gap d may change depending on the location of the data area 110 over which data is to be written. In some implementations, the head control section 20 may measure a gap d associated with each data area. In these implementations, the head control section 20 may further divide each track in the data area into a plurality of zones, and measure a gap d associated with each zone.

Figure 6:
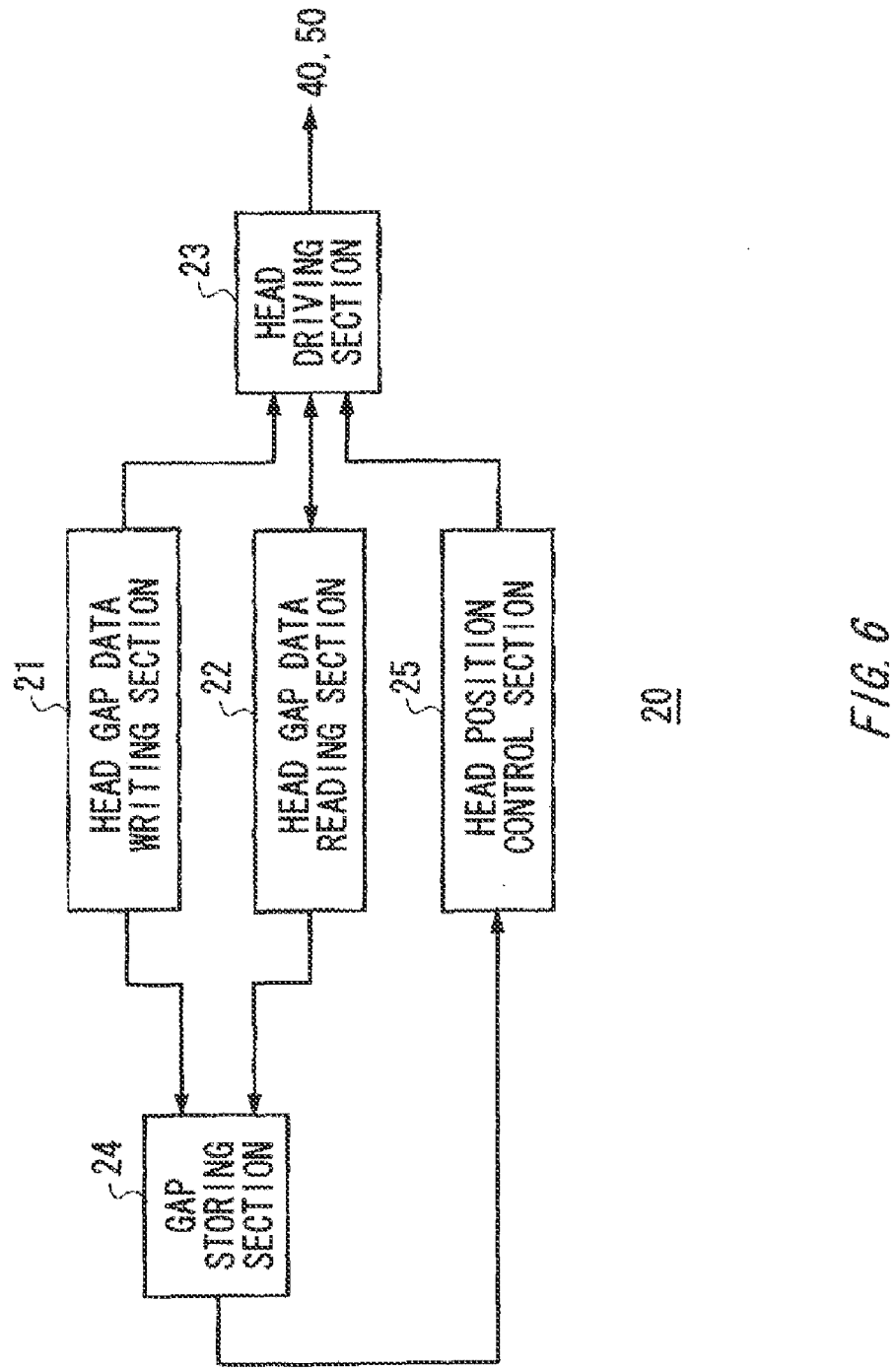
FIG. 6 illustrates an example configuration of a head control section.

FIG. 6 illustrates an example configuration of the head control section 20. As shown, the head control section 20 may include a head gap data writing section 21, a head gap data reading section 22, a head driving section 23, a gap storing section 24, and a head position control section 25.

The head driving section 23 may control the position and operation of the head section 50. For example, the head driving section 23 may control the position of the head section 50 by driving the actuator arm 40. The head driving section 23 also may control the write head 52 and read head 54 to perform data writing and data reading.

The head gap data writing section 21, head gap data reading section 22 and gap storing section 24 may control the head driving section 23 to detect the gap d by using test data, as described with reference to FIG. 5. The head position control section 25 may command the head driving section 23 to position the write head 52 over a data area to perform data writing or reading. In one implementation, when writing data into a data area, the head driving section 23 may adjust or compensate for the position of the head section 50 based on gap information stored by the gap storing section 24.

Figure 7:
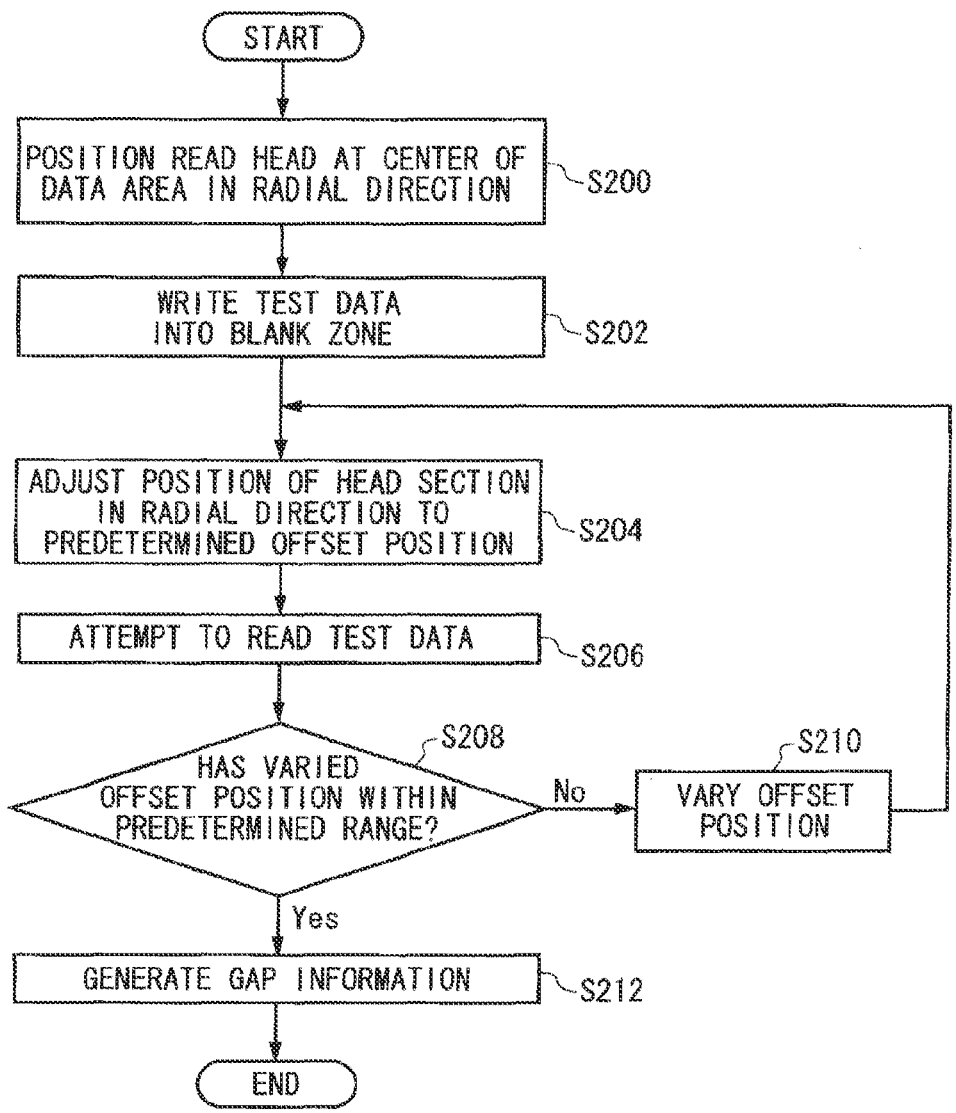
FIG. 7 is a flow diagram showing an example of a gap information generation process.

FIG. 7 is a flow diagram showing an example of a gap information generation process. As shown, the process begins with positioning a read head at the center of a data area (step S200). In one implementation, positioning a read head at the center of a data area includes positioning the read head over the central axis of the data area in the radial direction.

For example, as shown in FIG. 5, the head gap data writing section 21 and the head driving section 23 may position the read head 54 over a blank zone 170 along the center line of a given data area 110. The head gap data reading section 22 may command the read head 54 to read the data written in a given servo sector 150, and based on the read data, re-position the read head 54 to the center region of the data area 110 in the radial direction.

Then, the head gap data writing section 21 may command the write head 52 to write test data into the blank zone 170 (step S202). In one implementation, the write head 52 writes test data into the blank zone 170 while maintaining the position of the read head 54 (as determined in step S200). In another implementation, the test data may include a data pattern distinguishable from the control pattern written in the servo sector 150. In yet another implementation, if a predetermined data pattern has previously been written in the blank zone 170, the test data may include a data pattern distinguishable from the written data pattern.

The gap d may be measured by comparing the position of the read head 54 and the write head 52. In one implementation, while the gap d is measured, the head gap data writing section 21 may command the write head 52 to write test data into other regions of the blank zone 170 corresponding to the data areas 110.

Next, the head gap data reading section 22 adjusts the position of the head section 50 to a predetermined offset position (step S204). In one implementation, the offset position may be determined in advance (e.g., by a user or from empirical data) based on, for example, design information of the head section 50 and other associated components. In another implementation, the offset position may be determined based on the gap d. In this implementation, if the measured gap between the write head and the read head is d, the head may be offset by the same distance d, for example, from the center axis of the corresponding data area over which data is to be written (e.g., see FIG. 9)

In one implementation, the head gap data reading section 22 may employ a displacement distance D as the offset position. In this implementation, the determination of the displacement distance D may be initiated upon, for example, detecting that the read head 54 is situated over a region with no written test data. In one implementation, when the read head 54 is closer to an edge of the recording medium 100 than the write head 52, the head gap data reading section 22 may displace the position of the head section 50 by half a track towards the edge of the recording medium 100. In other words, the head gap data reading section 22 may displace the position of the head section 50 towards the relative position of the read head 54 with respect to the write head 52. In another implementation, when the gap d measured between the write head 52 and the read head 54 is larger than half the width of the test data (or blank zone), the displacement distance D may be set to zero.

Subsequently, the head gap data reading section 22 reads the written test data (step S206). In one implementation, the head gap data reading section 22 may read the written test data while maintaining the position of the head section 50 (as determined in the step S204). In another implementation, the head gap data reading section 22 may determine whether the read data pattern matches the test data pattern at the offset position. In this implementation, if the read data pattern does not match the test data pattern, the head gap data reading section 22 may calculate an error rate indicating a degree of error between the read data pattern and the data pattern of the test data.

In one implementation, the head gap data reading section 22 may determine whether the offset position is within a predetermined range (step S208). In this implementation, the predetermined range may depend on how far the head section 50 has been displaced, and whether the displacement is acceptable. A suitable range may allow the head section 50 to be displaced by one or more tracks from the offset position (as determined in step 204).

If it is determined that the offset position is not within the predetermined range, the head gap data reading section 22 may modify the offset position (step S210) and repeat the gap information generation process beginning from step S204. If it is determined that the offset position is within the predetermined range, the head gap data reading section 22 may proceed to calculate an error rate associated with the offset position and generate gap information based on the calculated error rate. In one implementation, the error rate may be determined based on a difference between the read data pattern and the test data pattern. In another implementation, the gap information may be measured based on a difference in position of the head section 50 when test data is written and written test data is read. In this implementation, the gap information may correspond to the gap d between the write head 52 and the read head 54. If desired, the gap d may be measured with respect to each data area 110 as the head gap data reading section 22 reads the test data from the data areas 110. Data collected from each gap measurement may be stored in the gap storing section 24. Based on the store gap information, the head position control section 25, for example, may appropriately compensate and adjust (or re-adjust) the position of the head section 50 while writing data into or reading data from the data areas 110.

Figure 8:
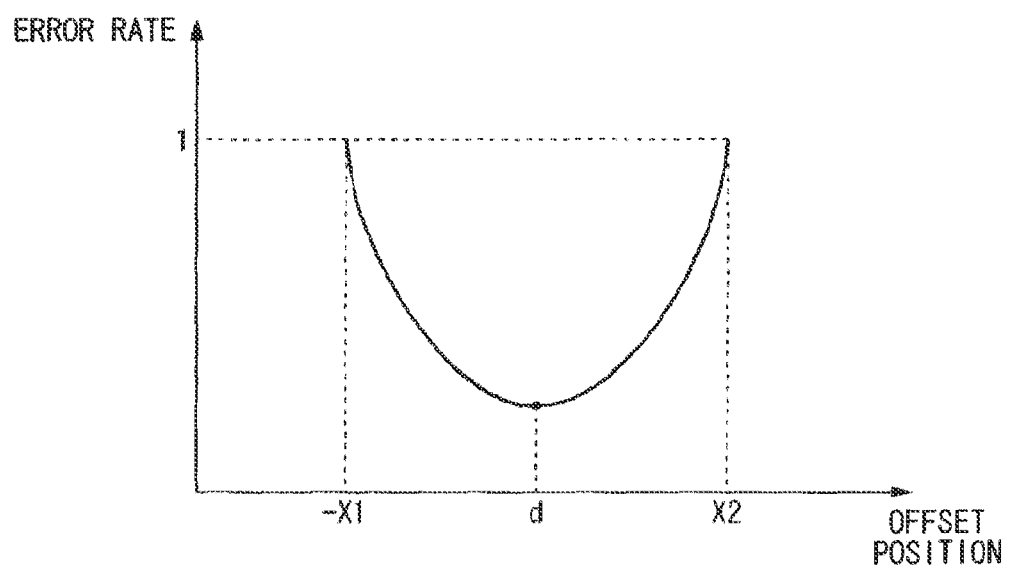
FIG. 8 shows an example graph illustrating a relationship between an error rate and an offset position.

FIG. 8 shows an example graph illustrating a relationship between an error rate and an offset position. In FIG. 8, the horizontal axis represents the offset position with respect to the center line of a given data area 110, and the vertical axis represents the error rate associated with the read test data measured at the offset position.

As shown, as the offset distance increases (e.g., the read head 54 is positioning out of range with respect to a data area), the recording apparatus 10 can no longer perform test data writing or reading. In this case, the error rate may be interpreted as 1. As the position of the read head 54 moves towards the center region of a data area (e.g., in the radial direction), the error rate decreases. When the read head 54 is positioned at the center region of the data area, the error rate is at a minimum, and the offset position is substantially equal to the gap d. Therefore, the recording apparatus 10 can measure the gap d between the write head 52 and the read head 54 by detecting an offset distance associated with the lowest error rate.

In one implementation, the head gap data writing section 21 may write dummy data adjacent to the test data in the radial direction. The dummy data may include a different data pattern from that of the test data. For example, the dummy data may include a data pattern having a low correlation value with respect to the data pattern of the test data.

In another implementation, the head gap data writing section 21 may write, for example, two pieces of dummy data so that the test data is disposed between the pieces of dummy data in the radial direction. Because a data area separating section may not be formed between the test data and the dummy data, the test data and dummy data may interfere with each other to thereby increase the error rate associated with the test data. In this way, the head gap data reading section 22 may easily detect a suitable offset position that can achieve a low (or lowest) error rate.

In one implementation, a data pattern different from the test data pattern may be written in one or more blank zones 170 prior to writing test data. In this implementation, the data pattern may not necessarily be a data pattern with all bits set to a high (H) or low (L) logic. For example, the H and L logics may alternate with each other across the entire region of a blank zone. The head gap data writing section 21 may overwrite a blank zone having prior data with the test data.

Figure 9:
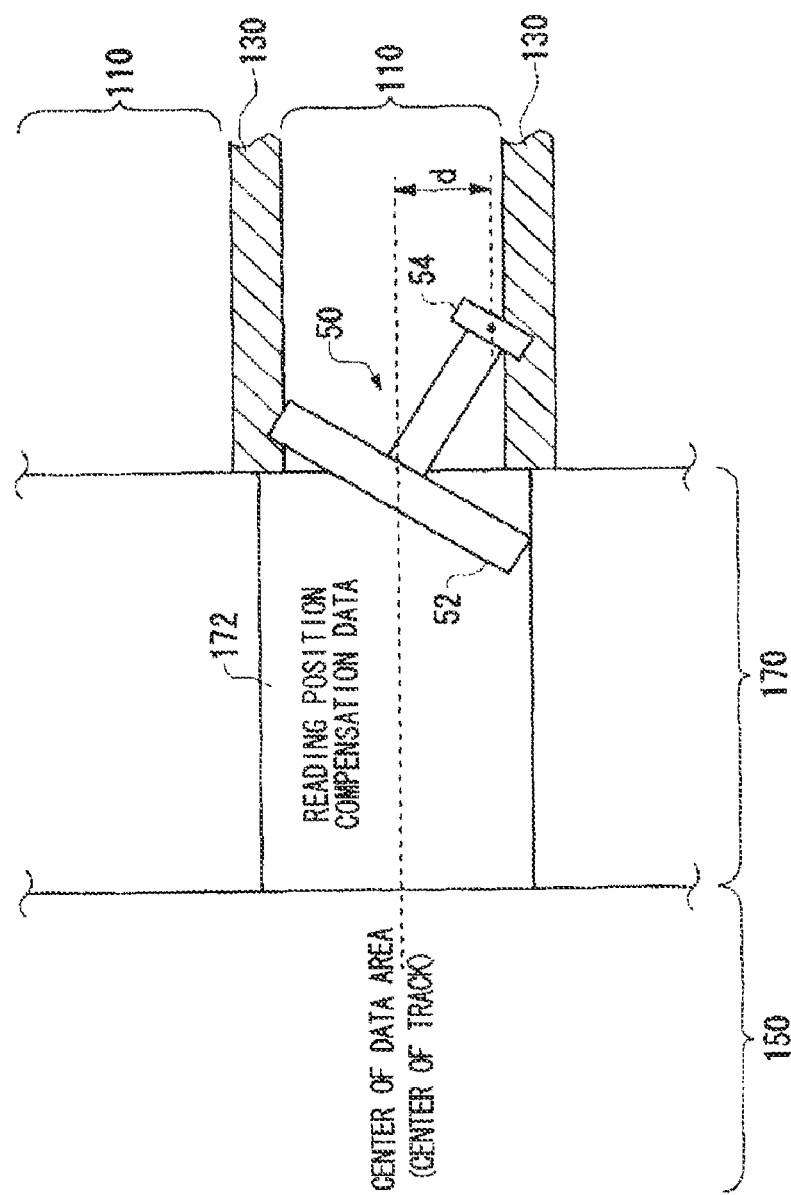
FIG. 9 illustrates another example position of a head section relative to a surface of a recording medium.

FIG. 9 illustrates another example position of the head section 50 relative to the recording medium 100. As discussed above, the gap storing section 24 may be used to store gap information. In one implementation, the stored gap information may be used as compensation data for compensating the head position. For example, the head control section 20 may write compensation data into the blank zone 170 for compensating the position of the head section 50. The compensation data may be written into the blank zone 170 in a rewritable fashion, which may be different from the control pattern written into the servo sector 150.

In one implementation, the compensation data may be used to compensate the repeatable runout (RRO) synchronized with the rotation of the recording medium 100, which may be caused by, for example, eccentricity of the substrate 102, deformation of the substrate and/or other external factors. In another implementation, when the center of the substrate is de-centered, the position of the head section 50 may be re-adjusted for the data areas 110, even if the data areas 110 are on the same track.

In one implementation, the head control section 20 may write reading position compensation data 172 into the blank zones 170. The reading position compensation data 172 may be used for compensating the position of the head section 50 when reading data from the data areas 110. Each blank zone 170 may be adjacent to the data areas 110, and the head control section 20 may write the reading position compensation data 172 into a region in the blank zone corresponding to a data area 110.

In another implementation, the head control section 20 may write the reading position compensation data 172 where the center line of the reading position compensation data 172 in the radial direction coincides with the center line of the corresponding data area 110. In other words, the head control section 20 may control the head section 50 to a position as determined by adding an offset corresponding to the gap d to the center line of the corresponding data area 110, and writing the reading position compensation data 172. Thus, when positioning the read head 54 on the center line of the data area 110 to read out the data from the data area 110, the head control section 20 also may read out the corresponding reading position compensation data 172 without changing the head position.

In one implementation, prior to reading the data from the data area 110, the head control section 20 may first read out the corresponding reading position compensation data 172 and based on the read data, subsequently compensate the position of the head section 50. Alternatively, the reading position compensation data 172 may be set and stored in advance so that the data may be retrieved and used for compensating the head position.

Figure 10:
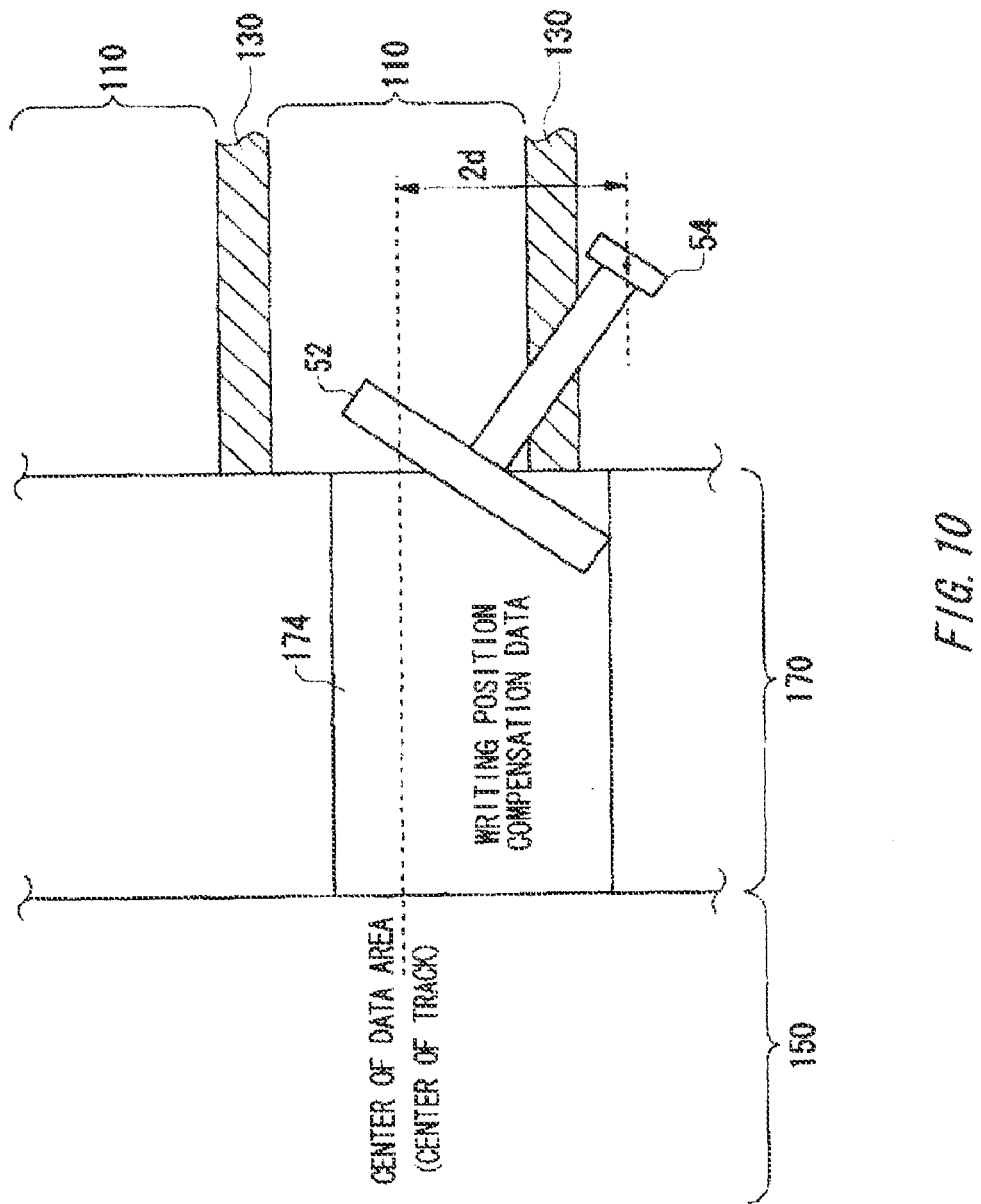
FIG. 10 illustrates yet another example position of a head section relative to a surface of a recording medium.

FIG. 10 illustrates yet another example position of the head section 50 relative to the recording medium 100. As shown, the head control section 20 writes writing position compensation data 174 into the blank zone 170. In one implementation, the writing position compensation data 174 may be used for compensating the position of the head section 50 while writing data into the data areas 110. The head control section 20 may control the write head 52 to write the writing position compensation data 174 into a region in the blank zone corresponding to a data area 110.

The head control section 20 may write the writing position compensation data 174 where the center line of the writing position compensation data 174 in the radial direction is displaced towards the relative position of the read head 54 with respect to the write head 52 from the center line of the corresponding data area 110 by the gap d. In other words, the head control section 20 may control the head section 50 to a position as determined by adding, in the radial direction, an offset corresponding to a distance with a value twice the gap d to the center line of the corresponding data area 110, and writing the writing position compensation data 174. Thus, when moving the read head 54 to the position distant by the gap d from the center line of the data area 110 in order to write data into the data area 110, the head control section 20 can read the writing position compensation data 174 without changing the head position.

Figure 11:
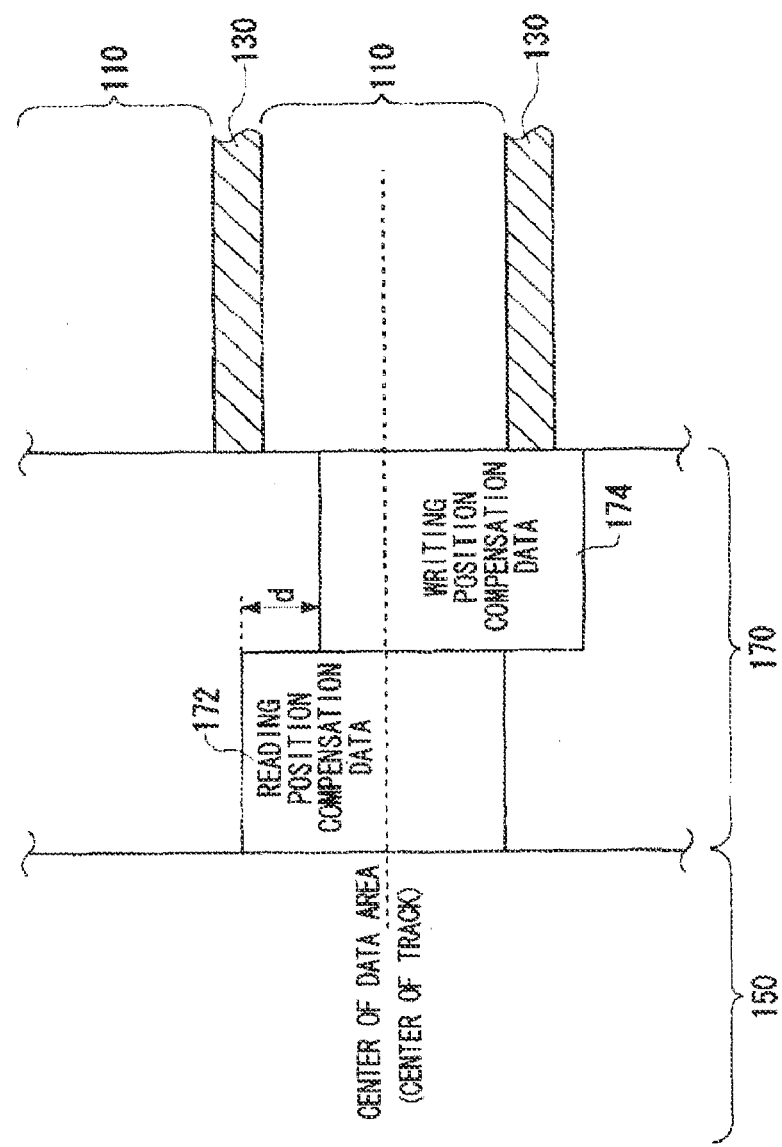
FIG. 11 illustrates an example blank zone written with reading position compensation data and writing position compensation data.

To write data into the data area 110, the head control section 20 may read the corresponding writing position compensation data 174 and based on the read data, compensate the position of the head section 50. Alternatively, the writing position compensation data 174 may be set and stored in advance so that the data may be retrieved and used for compensating the head position FIG. 11 illustrates an example blank zone written with reading position compensation data and writing position compensation data. As shown, the head control section 20 may write both the reading position compensation data 172 and the writing position compensation data 174 into the blank zone 170. The head control section 20 may write the reading position compensation data 172 and writing position compensation data 174 in such a manner that the reading position compensation data 172 and writing position compensation data 174 may be arranged adjacent to each other in the track direction as illustrated in FIG. 11. The reading position compensation data 172 and writing position compensation data 174 also may be written at positions different from the other in the radial direction by the gap d (as described with reference to FIGS. 9 and 10). In one implementation, the gap d may be different for each data area 110.

Figure 12:
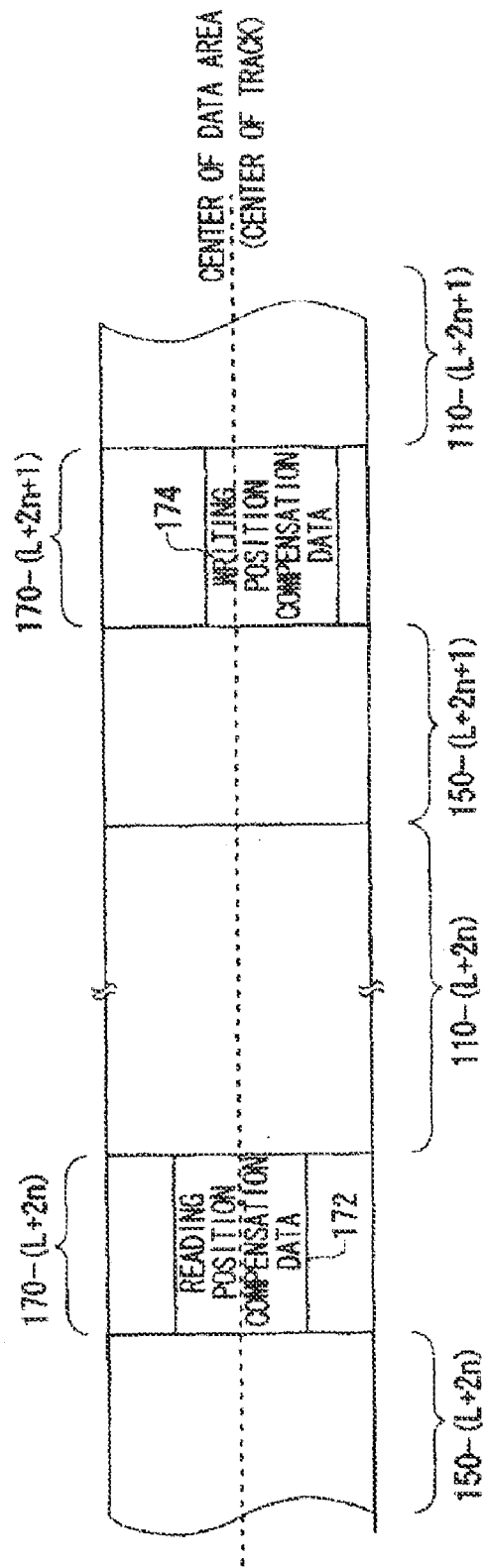
FIG. 12 illustrates an example of reading position compensation data and writing position compensation data written in separate blank zones.

FIG. 12 illustrates reading position compensation data and writing position compensation data written in separate blank zones. As shown, the head control section 20 may write the reading position compensation data 172 and the writing position compensation data 174 (e.g., in the track direction) into blank zones 170 that are positioned at different locations on the medium 100. Specifically, the head control section 20 may write the reading position compensation data 172 into a blank zone 170-(L+2n) (e.g., an odd number-th blank zone) in the track direction, and write the writing position compensation data 174 into a blank zone 170-(L+2n+1) (e.g., an even number-th blank zone) in the track direction.

In one implementation, the head control section 20 may write data with a predetermined interval being provided between adjacent pieces of data arranged in the radial direction in order to further reduce the data interference between the data written in each blank zone 170. For example, the head control section 20 may write data into a single blank zone 170 for every two sequentially tracks in the radial direction. Alternatively, the head control section 20 may write error compensation data into each blank zone 170 in a region corresponding to each data area 110.

Figure 13:
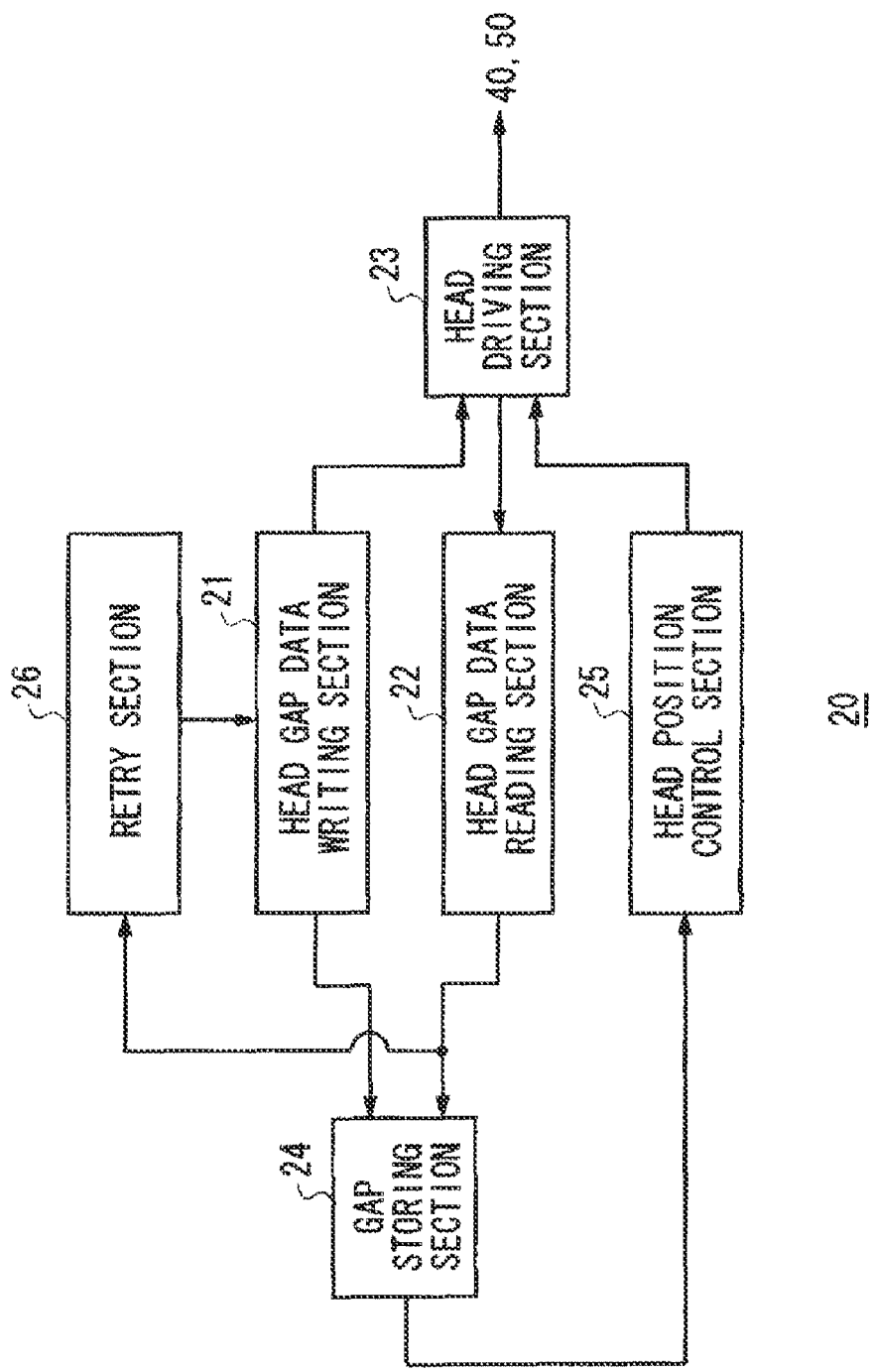
FIG. 13 illustrates yet another example configuration of a head control section.

FIG. 13 illustrates yet another example configuration of the head control section 20. As shown, the recording medium 100 may not have the blank zones 170 provided therein. The head control section 20 may include a retry section 26 in addition to the constituents of the head control section 20 described with reference to FIG. 6. According to the present example, the head gap data writing section 21 writes the test data into the data areas 110.

In one implementation, the retry section 26 may be used to determine whether a particular test data writing has failed when the head gap data reading section 22 fails to read test data by varying the position (e.g., sequentially) of the head section 50 in the radial direction as described with reference to the steps S204 to S210 in FIG. 7. For example, the retry section 26 may determine that a particular test data writing fails because the write head 52 may be positioned on a data area separating section 130 at the time of the test data writing.

In this implementation, the retry section 26 may vary the head position for the test data writing and the head gap data writing section 21 may repeat writing the test data. The retry section 26 also may be configured to command the head gap data reading section 22 to read the written test data (e.g., as described with reference to the steps S204 to S210 shown in FIG. 7). This implementation allows the retry section 26 to vary the head position for writing test data until which the written test data can be read by the head gap data reading section 22. This structure allows the recording apparatus 10 to measure gap information even when in the absence of the blank zones 170.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the scope of the invention.

What is claimed is:

1. A recording medium comprising:
    a plurality of data areas, each data area being configured to store data;
    a plurality of data area separating sections, each data area separating section being disposed between the data areas and extending in parallel with respect to the data areas, each data area separating section being configured to prevent data from being written into the data area separating section; and one or more blank zones each extending in a direction perpendicular to the data areas, the one or more blank zones being configured to record written data, wherein the written data is recorded by a write element of a head at a location that corresponds to a position of a read element of the head, the position is offset from a center region of a corresponding data area in a radial direction, and the position is determined based on a gap between the write element and the read element in the radial direction.

2. The recording medium of claim 1, further comprising:
one or more servo sectors formed between the one or more blank zones and the plurality of data areas, each servo sector having a control pattern.

3. The recording medium of claim 2, wherein the control pattern includes one or more regions configured for storing burst data.

4. The recording medium of claim 3, wherein a length of a blank zone extending in a circumference direction is larger than a length of a region configured for storing burst data extending in the circumference direction.

5. The recording medium of claim 2, wherein the plurality of data areas, the one or more servo sectors, and the one or more blank zones are alternately arranged in a circumference direction.

6. The recording medium of claim 1, wherein each blank zone extends from an inner edge of the medium to an outer edge of the medium.

7. The recording medium of claim 1, wherein a length of a blank zone extending in a circumference direction is shorter than a length of a data area extending in the circumference direction.

8. The recording medium of claim 1, further comprising one or more servo sectors corresponding to the one or more blank zones, wherein each of the one or more blank zones extends along a corresponding one of the one or more servo sectors.

9. The recording medium of claim 1, further comprising one or more servo sectors corresponding to the one or more blank zones, wherein each servo sector includes:
an amplitude adjusting region containing amplitude adjusting data to adjust an amplitude amplifying ratio to be used by the head to read written data from the recording medium;
a servo address mark region containing address mark data to identify a corresponding servo sector;
a track address region containing track address data to distinguish a corresponding track;
a sector address region containing sector address data to distinguish a corresponding data sector; and
one or more burst data regions containing burst data to be used for adjusting a spatial position of the head.

10. The recording medium of claim 1, further comprising one or more servo sectors formed between the one or more blank zones and the plurality of data areas,
wherein at least one data area includes a plurality of data sectors arranged in a track direction, and at least one data sector includes two or more data sub-sectors that are arranged at a front and a back of a servo sector or a blank zone so as to sandwich the servo sector or the blank zone between the two or more data sub-sectors.

11. The recording medium of claim 1, wherein the one or more blank zones are provided immediately adjacent to a corresponding one of the plurality of data areas.

12. The recording medium of claim 1, wherein the one or more blank zones and the plurality of data areas are formed in a one-to-one ratio.

13. The recording medium of claim 1, wherein at least one blank zone includes a length in a track direction that is larger than a distance between the read element and the write element of the head in a direction that an actuator arm of the head extends.

14. The recording medium of claim 1, further comprising one or more servo sectors corresponding to the one or more blank zones, wherein at least one of the one or more blank zones is written with a data pattern different from that written in the one or more servo sectors.

15. The recording medium of claim 1, wherein at least one blank zone contains two different data patterns that alternate across the at least one blank zone.

16. The recording medium of claim 1, wherein the one or more blank zones contain compensation data to compensate a position of the head when reading written data from or writing new data to the plurality of corresponding data areas.

17. The recording medium of claim 16, wherein the compensation data in the one or more blank zones is written at a location that coincides with a center region of a corresponding data area in a radial direction.

18. The recording medium of claim 16, wherein the compensation data in the one or more blank zones is written at a location that is displaced towards a position of the read element of the head with respect to the write element of the head from a center region of a corresponding data area in a radial direction.

19. The recording medium of claim 16, wherein the compensation data includes a first compensation data and a second compensation data different from the first compensation data, the second compensation data located adjacent to the first compensation data in a track direction.

20. The recording medium of claim 16, further comprising a plurality of blank zones including a first blank zone and a second blank zone different from the first blank zone,
wherein:
the compensation data includes a first compensation data and a second compensation data different from the first compensation data; and
the first blank zone is written with the first compensation data and the second blank zone is written with the second compensation data.

* * * * *